United States Patent
Roth

(10) Patent No.: US 10,517,222 B2
(45) Date of Patent: Dec. 31, 2019

(54) DRIVE ARRANGEMENT FOR POWERING THE PLUNGER OF AN AGRICULTURAL BALER

(71) Applicant: DEERE & COMPANY, Moline, IL (US)

(72) Inventor: Darin L Roth, Batavia, IA (US)

(73) Assignee: DEERE & COMPANY, Moline, IL (US)

( * ) Notice: Subject to any disclaimer, the term of this patent is extended or adjusted under 35 U.S.C. 154(b) by 1012 days.

(21) Appl. No.: 15/001,816

(22) Filed: Jan. 20, 2016

(65) Prior Publication Data

US 2016/0135374 A1 May 19, 2016

Related U.S. Application Data

(62) Division of application No. 13/330,067, filed on Dec. 19, 2011, now Pat. No. 9,277,692.

(51) Int. Cl.
*A01F 15/08* (2006.01)
*A01F 15/04* (2006.01)

(52) U.S. Cl.
CPC ............ *A01F 15/085* (2013.01); *A01F 15/04* (2013.01); *A01F 15/0841* (2013.01); *Y10T 74/19* (2015.01)

(58) Field of Classification Search
CPC .... A01F 15/0841; A01F 15/085; A01F 15/04; F16H 37/041; F16H 1/28; F16H 1/2809; F16H 1/2827; Y10T 74/19
USPC ..... 100/3, 179, 280, 282; 56/10.8, 341, 344; 74/15.4; 475/263, 295, 302
See application file for complete search history.

(56) References Cited

U.S. PATENT DOCUMENTS

| | | | |
|---|---|---|---|
| 3,018,718 A | 1/1962 | Wenzel | |
| 4,423,794 A * | 1/1984 | Beck | B60K 6/105 180/165 |
| 4,615,238 A | 10/1986 | Cheatum | |
| 5,894,718 A | 4/1999 | Hawlas et al. | |
| 5,899,054 A | 5/1999 | Hawlas et al. | |
| 5,947,854 A * | 9/1999 | Kopko | F16H 3/72 475/153 |
| 6,105,353 A | 8/2000 | Mohr et al. | |
| 6,651,416 B2 | 11/2003 | Trelstad et al. | |
| 6,701,834 B2 | 3/2004 | Roth | |

(Continued)

FOREIGN PATENT DOCUMENTS

| | | |
|---|---|---|
| AU | 20030200756 B2 | 9/2003 |
| BR | PI0904279-2 A2 | 9/2010 |

(Continued)

OTHER PUBLICATIONS

English Translation of DE 9211256 U1.*

(Continued)

*Primary Examiner* — Jimmy T Nguyen

(57) ABSTRACT

An agricultural baler including a base unit, a plurality of ground engaging devices and a transmission. The plurality of ground engaging devices support the base unit. The transmission is mounted on the base unit. The transmission includes an input shaft and an other shaft. The other shaft is separate from the input shaft. The other shaft is drivingly coupled to the input shaft. The other shaft is connected to a flywheel and/or a hydraulic pump. The other shaft is configured to operate at a different speed than the speed at which the input shaft operates.

6 Claims, 4 Drawing Sheets

(56) References Cited

U.S. PATENT DOCUMENTS

| | | |
|---|---|---|
| 7,900,555 B2 | 3/2011 | Webber |
| 8,113,078 B2* | 2/2012 | Lang et al. |
| 9,277,692 B2* | 3/2016 | Roth .................. A01F 15/0841 |
| 2003/0159421 A1 | 8/2003 | Treslstad et al. |
| 2003/0167939 A1 | 9/2003 | Roth |
| 2010/0108413 A1 | 5/2010 | Lang et al. |
| 2010/0175359 A1 | 7/2010 | Webber |

FOREIGN PATENT DOCUMENTS

| | | |
|---|---|---|
| DE | 9211256 U1 | 11/1992 |
| DE | 19628606 C2 | 6/1996 |
| DE | 19628604 A1 | 1/1998 |
| DE | 19621391 A1 | 2/2006 |
| EA | 019541 B1 | 4/2014 |
| EA | 021173 B1 | 4/2015 |
| EP | 0209743 A1 | 1/1987 |
| EP | 0819374 A1 | 1/1998 |
| EP | 0819375 A1 | 1/1998 |
| EP | 1340420 A1 | 9/2003 |
| EP | 1340421 A1 | 9/2003 |
| EP | 2193707 A1 | 6/2010 |
| EP | 2208413 B1 | 7/2010 |

OTHER PUBLICATIONS

European Search Report in foreign counterpart application No. 12195644.5 dated Apr. 11, 2013 (6 pages).
BR Search Report issued in counterpart application No. 1020120322196, dated Aug. 2, 2018 (7 pages).

* cited by examiner

DRIVE ARRANGEMENT FOR POWERING THE PLUNGER OF AN AGRICULTURAL BALER

CROSS REFERENCE TO RELATED APPLICATIONS

This application is a divisional of U.S. application Ser. No. 13/330,067, titled "Drive Arrangement For Powering The Plunger Of An Agricultural Baler," filed Dec. 19, 2011, which is hereby incorporated by reference in its entirety.

FIELD OF THE INVENTION

The present invention relates to an agricultural baler, and, more particularly, to a driver arrangement for powering the plunger of an agricultural square baler.

BACKGROUND OF THE INVENTION

A cut and raked crop that has been dried or otherwise prepared in a field, such as hay, straw or other agricultural material is often gathered, compressed and shaped by an agricultural baler. There are several types of balers that are commonly used, each resulting in different types of bales. Some are rectangular and some are cylindrical of various sizes. Bales can be bound with netting, strapping, wire or traditionally twine. A baler that produces small rectangular bales, often called square bales, often produce bales that are typically wrapped with two strands of knotted twine. The bales are light enough for easy handling and typically weigh from 40 to 80 pounds. A bale is formed by a series of processes performed by the square baler including lifting the windrowed material, hereinafter referred to as hay, by way of the pickup portion of the baler. The hay is then moved by way of an auger into a chamber that has a feeding fork. The feeding fork moves the hay in front of a sliding plunger with a cutting edge that cuts the hay and moves the hay in the chamber into previously packed hay therein causing the hay to be compressed. Once a predetermined amount of hay has been gathered in the chamber, as measured by the amount being extruded through the opening at the rear of the chamber, a mechanism is triggered causing the twine to be threaded through the hay, cut and then knotted thereby forming the bale and one portion of the twine is retained to start to receive hay for the next bale. As the bales are moved through the compression channel out to the rear of the baler, the baled hay is then either loaded onto a wagon or dropped into the field for later retrieval.

The plunger mechanism of the square baler requires a considerable amount of energy to cut and compress the hay. Typically the mass of the plunger is augmented by a flywheel connected so that energy from the tractor during the non-compressing part of the stroke is stored in the flywheel and then is expended as the plunger compresses the hay. Some older balers including some currently being used by the Amish have a gasoline engine mounted thereon with a belt drive directly driving the flywheel of the baler. Typically balers have the flywheel oriented towards the front of the baler with the PTO shaft from the tractor directly driving the flywheel that is then interconnected to the plunger.

Another type of baler in common use today is one that produces large rectangular bales. These larger rectangular bales are many times larger than the smaller bales previously discussed. The baling concept is similar in that the hay is picked up and then compressed in a chamber and extruded from the back of the baler once the desired size is reached and the twine is secured around the bale. The large rectangular balers require even more energy and a larger flywheel to provide the sustained energy requirement during the compression portion of the plunger stroke.

The problem with the larger energy requirement of larger balers is that a large flywheel is required to even out the power demands of the baler. Another problem with the prior art is that in light crop conditions or uneven terrain where forward travel speed is limited causes the prior art balers to compact a portion of the bale several times before gathering enough material to introduce to the compression chamber for compacting by the plunger. This causes a portion of the hay in the bale to be recompacted causing undue damage to the hay as it is mechanically impacted, compressed and relaxed with each stroke.

What is needed in the art is a baler that alters the plunger drive speed and reduces the need for a large flywheel.

SUMMARY

The present invention provides an apparatus for altering the plunger speed as well as reducing the flywheel size of an agricultural baler.

The invention in one form is directed to an agricultural baler including a base unit, a plurality of ground engaging devices and a transmission. The plurality of ground engaging devices support the base unit. The transmission is mounted on the base unit. The transmission includes an input shaft and an other shaft. The other shaft is separate from the input shaft. The other shaft is drivingly coupled to the input shaft. The other shaft is connected to a flywheel and/or a hydraulic pump. The other shaft is configured to operate at a different speed than the speed at which the input shaft operates.

The invention in another form is directed to a method of powering an agricultural baler. The method includes the steps of providing shaft torque and driving a flywheel and/or hydraulic pump. Shaft torque is provided to an input shaft of a transmission. The driving step includes driving the flywheel and/or hydraulic pump connected to an other shaft apart from the input shaft. The other shaft is drivingly coupled to the input shaft. The other shaft is configured to operate at a different speed than a speed at which the input shaft operates.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION

Figure 1:
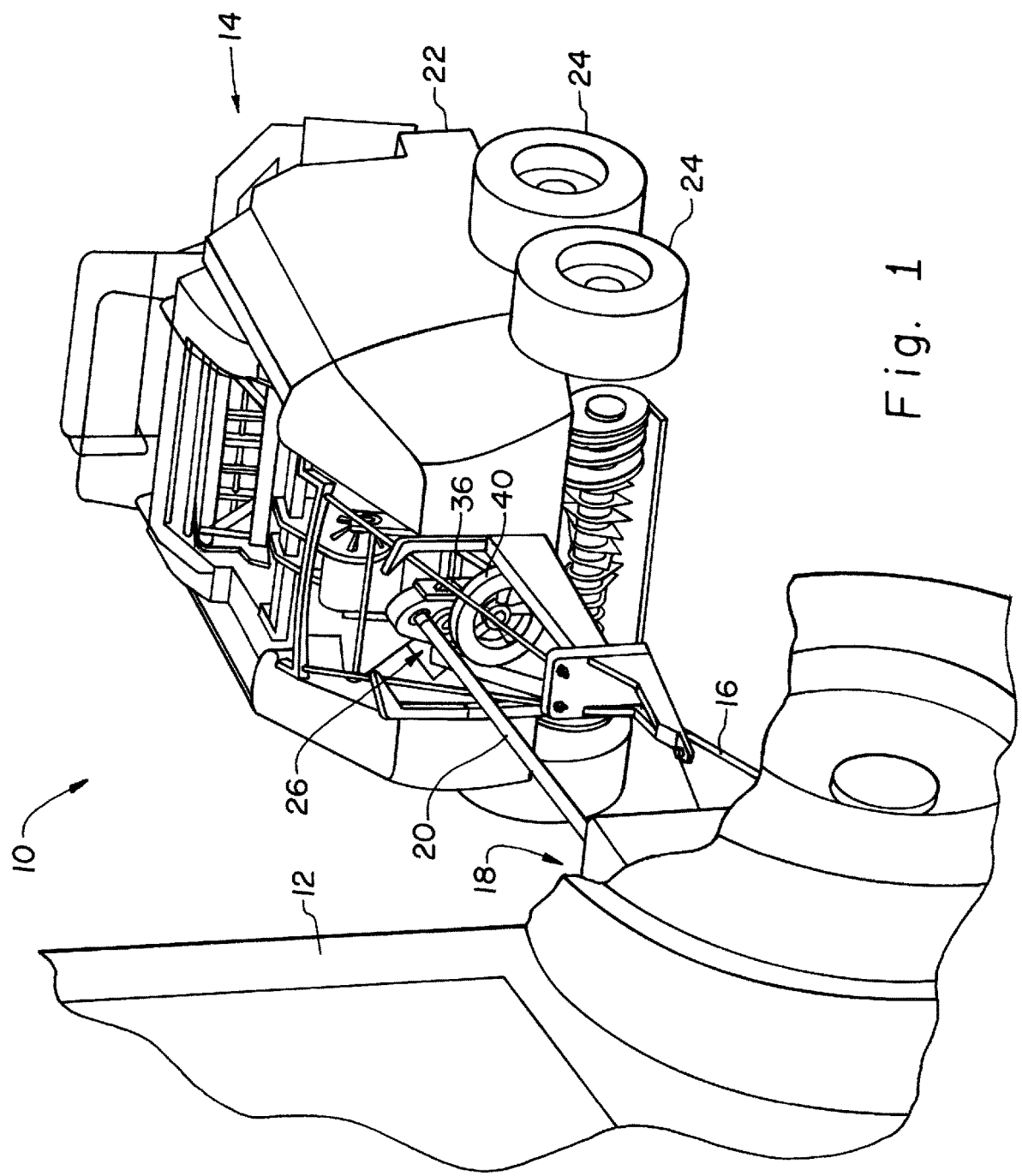
FIG. 1 is a perspective partially sectioned view of a baling system including an embodiment of a transmission of the present invention.

Referring now to the drawings, and more particularly to FIG. 1, there is illustrated a baling system 10 including a tractor 12, and a baler 14. Baler 14 is connected to tractor 12 by way of hitch 16 thereby providing towing for the movement of baler 14. Tractor 12 additionally has a power takeoff (PTO) unit 18 providing rotational power by way of PTO shaft 20 to mechanisms in baler 14.

Baler 14 includes a base unit 22, ground engaging devices 24 and a transmission 26 connected to base unit 22. PTO shaft 20 connects to transmission 26 providing rotational power to transmission 26.

Figure 2:
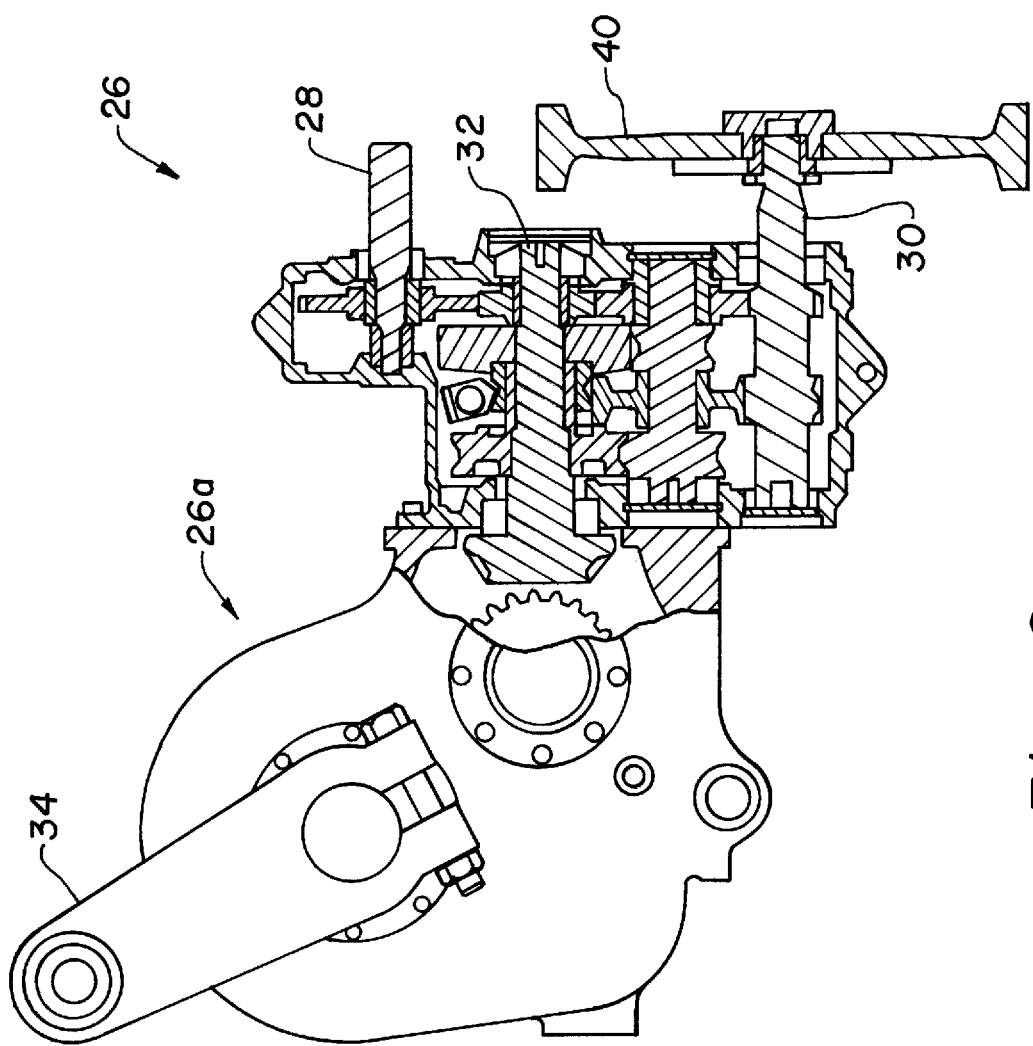
FIG. 2 is a partially sectioned side view of the transmission of FIG. 1.
Figure 3:
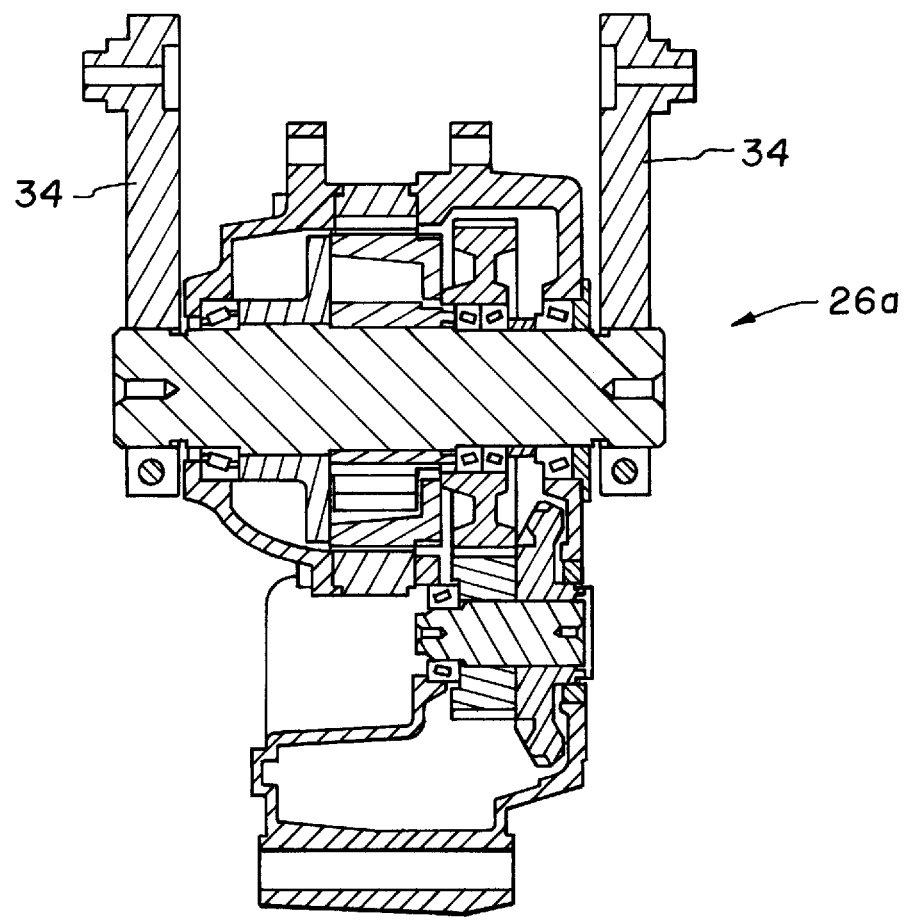
FIG. 3 is a partially sectioned front view of the transmission gearbox of FIGS. 1 and 2.
Figure 4:
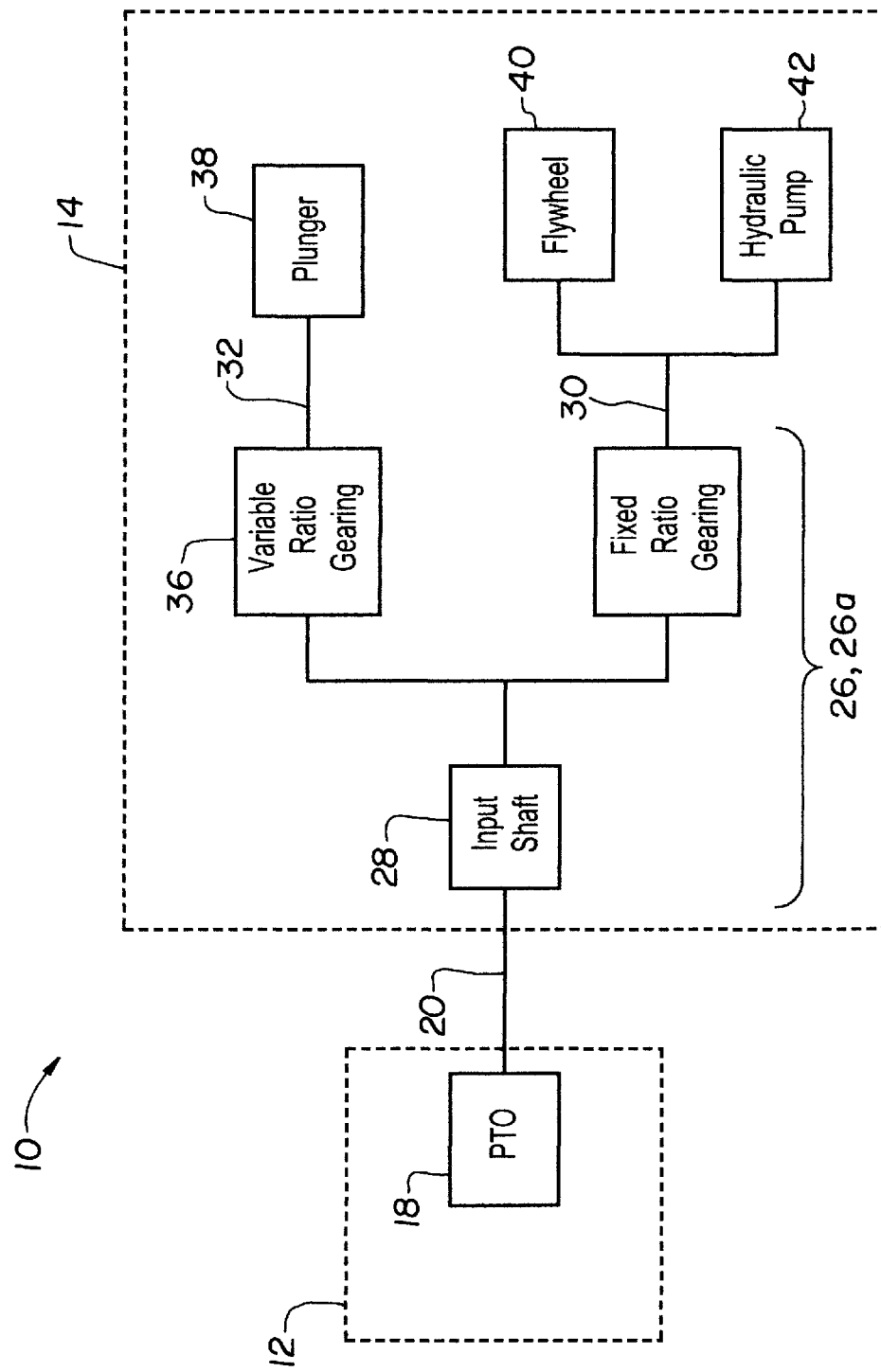
FIG. 4 is a schematical view of the baling system of FIGS. 1-3.

Now, additionally referring to FIGS. 2-4, transmission 26 is associated with or may be integral with a gear box 26a for the transfer of rotational power from tractor 12 for the baling operation of baler 14. Transmission 26 additionally includes an input shaft 28, another shaft 30, and an output shaft 32, with a plunger drive crank 34 drivingly connected thereto. Transmission 26 additionally includes a gear selector 36 that allows for the changing of the gearing ratio to alter the rotational speed of output shaft 32 relative to the input speed of input shaft 28. Connected to transmission 26/gearbox 26a is plunger drive crank 34 that is driven by output shaft 32 through gears in gearbox 26a. A plunger 38, shown schematically in FIG. 4, is connected to plunger drive crank 34, with plunger 38 compressing the hay entering baler 14. A flywheel 40 and a hydraulic pump 42 are connected to shaft 30. Alternatively, hydraulic pump 42 may be integral with transmission 26. Hydraulic pump 42 provides hydraulic power to the mechanisms of baler 14.

Gear selector 36 advantageously allows the operator to alter the gearing ratio of transmission 26 to thereby alter the output speed of shaft 32 relative to input shaft 28 to thereby alter the frequency of rotation of plunger drive crank 34 relative to the rotation speed of input shaft 28, thereby altering the number of compression strokes of plunger 38 over a period of time. This advantageously allows for the situations when the amount of crop is either heavy or lighter so that the functioning of baler 14 can be tailored to the crop conditions. For example, during a later cutting of hay the volume of hay is often less than an earlier cutting and the later cutting of hay, as it is compressed in baler 14, can be compressed at a lower frequency by way of the gear selection. This preserves the quality of the hay since the hay is impacted fewer times by plunger 38. The selection of the gearing ratio that controls the speed of plunger 38 is accomplished by the operator selection made by way of gear selector 36.

The size of flywheel 40 is reduced over the size of flywheels that are directly driven by PTO shaft 20 in a conventional prior art baler. Since the stored energy is based upon the mass times the velocity squared, the faster that flywheel 40 spins has a dramatic impact upon the mass needed in flywheel 40 to store a desired amount of energy. For example if flywheel 40 turns twice as fast as input shaft 28 then flywheel 40 can have a mass that is one-fourth of the conventional flywheel to store the same amount of energy. The fixed gearing ratio between shaft 30 and input shaft 28 is greater than 1:1 and more particularly it is at least 2:1 and even more particularly 2.619:1. Since baler 14 is a large square baler, the present invention significantly reduces the weight associated with the flywheel and hence it reduces the weight of baler 14. Another shaft may drive hydraulic pump 42 with increased speed to thereby reduce the amount of pump displacement necessary to achieve similar flow as pumps that are mounted on gearboxes of the prior art.

Input shaft 28 is driven at a speed determined by the operator in the operation of tractor 12 and power takeoff device 18. Input shaft 28 is geared to operate at a different speed than shaft 30 or shaft 32. The speed of shaft 30 is such that it operates at a higher speed than input shaft 28. The gearing through gear box 26a results in a reduced speed but higher torque for the movement of plunger drive crank 34. Input shaft 28, shaft 30 and output shaft 32 all operate at different rotational speeds. Shaft 30 and input shaft 28 have a fixed ratio gearing relationship therebetween as illustrated in FIG. 4. Gear selector 36 allows for the gearing ratio between input shaft 28 and shaft 32 to be selected as illustrated as a variable ratio gearing. Gear selector 36 allows an operator to choose from at least two distinct gear ratios. There may be a larger instantaneous power in the gearing after flywheel 40 than there is in input shaft 28. Energy is dissipated from flywheel 40 during the compression stroke of plunger 38.

The powering of baler 14 includes providing a shaft torque to input shaft 28 that leads to the driving of flywheel 40 as well as hydraulic pump 42 at a higher speed than the speed of input shaft 28. Energy storage is accomplished by the increased speed of flywheel 40 as compared to prior art baling systems.

Advantageously, the present invention allows for a smaller overall weight of baler 14 by a significant reduction in the weight of flywheel 40. The powering of flywheel 40 and hydraulic pump 42 on shaft 30, separate from input shaft 28, and rotating at a faster speed than input shaft 28 allows for reduced space and lower mass of flywheel 40 and a reduced size of hydraulic pump 42. The flywheel of the present invention contains similar energy as those found in the prior art but at a fraction of the mass and size. Hydraulic pump 42 of the present invention may be a smaller displacement size yet deliver equal flow and pressure because of the increased speed from shaft 30. The shift mechanism of gear selector 36 is positioned after input shaft 28 and before the planetary arrangement of the gears in gearbox 26a, allowing for improved baler 14 performance at comfortable tractor 12 velocities in different crop conditions such as crop variances in volume, cut length, moisture, structure and mechanical properties. Likewise baler 14 may be shifted into a higher output speed in light crop conditions in order to operate tractor 12 at a slower engine speed for reduced fuel consumption.

The present invention advantageously, not only allows for a low-speed option for light crop conditions, but also allows a smaller tractor more time between plunger 38 strokes so that the tractor can recover it's engine speed. Also, the higher speed not only allows higher capacity, but also allows for larger tractors to run at lower engine speeds to save fuel.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of powering an agricultural baler, the method comprising the steps of:

providing shaft torque to an input shaft of a transmission, the transmission being mounted on a base unit of the agricultural baler;

driving at least one of a flywheel and a hydraulic pump connected to a fixed speed shaft drivingly coupled to the input shaft, the fixed speed shaft being configured to operate at a higher speed than a speed at which the input shaft operates; and driving a plunger mechanism connected to a variable speed shaft drivingly coupled to the input shaft, the variable speed shaft configured to operate at a different speed than the speed at which the fixed speed shaft operates.

2. The method of claim 1, wherein said speed of said fixed speed shaft and said speed of said input shaft are related to each other by a gearing ratio, said gearing ratio being greater than 1:1.

3. The method of claim 1, wherein the speed of the fixed speed shaft and the speed of the input shaft are related to each other by a gearing ratio, the gearing ratio being at least 2:1.

4. The method of claim 1, wherein the input shaft, the fixed speed shaft and the variable speed shaft each operate at different speeds from each other.

5. The method of claim 1, wherein the fixed speed shaft and the input shaft have a fixed gearing ratio relationship therebetween.

6. The method of claim 1, wherein the speed of the input shaft and the speed of the variable speed shaft are related to each other by a variable gearing ratio, the variable gearing ratio having a plurality of gearing ratio selections.

\* \* \* \* \*